United States Patent Office 2,921,064
Patented Jan. 12, 1960

2,921,064
6,7-DIHYDROXY ESTRADIOL AND INTERMEDIATES THEREOF

Howard J. Ringold, Jose Iriarte, and George Rosenkranz, Mexico City, Mexico, assignors to Syntex S.A., Mexico City, Mexico, a corporation of Mexico No Drawing. Application May 13, 1958
Serial No. 734,843

Claims priority, application Mexico May 17, 1957

18 Claims. (Cl. 260—239.55)

The present invention relates to novel cyclopentanophenanthrene derivatives and to a method for the production thereof.

More particularly the present invention relates to the novel 1,3,5(10)-estratriene-3,6,7,17β-tetrol, its esters, and a process for their production. These compounds are hormones of the estrogenic type having a particularly valuable anti-androgenic action, and a relatively small feminizing effect. The present invention also relates to 6,7-oxido derivatives of estrone (6,7-oxido derivatives of 1,3,5(10)-estratriene-3-ol-17-one) as well as to the corresponding 6,7-oxido derivatives of estradiol (6,7-oxido derivatives of 1,3,5(10)-estratriene-3,17β-diol) to the novel 1,3,5(10) - estratriene - 3,6,7 - triol-17-one and to esters of these compounds. All of these compounds are intermediates for the production of the first mentioned 1,3,5(10)-estratriene-3,6,7,17β-tetrol and its esters and are also hormones of the estrogenic type having a particularly valuable anti-androgenic action and a relatively small feminizing effect.

In accordance with the present invention it has been discovered that 6-dehydro-estradiol and 6-dehydro-estrone may be hydroxylated at the C-6 and C-7 positions to prepare the corresponding compounds having hydroxyl groups at C-6 and C-7. Further by reduction of the 17-keto group of the 6,7-dihydroxy-estrone derivatives the corresponding 6,7-dihydroxy-estradiol derivatives can be formed. The method of the present invention involves in one instance treatment of 6-dehydro estradiol or 6-dehydro estrone preferably in the form of their lower fatty acid esters with osmium tetroxide to form the corresponding 3,17-diacylate-6,7-osmate of 1,3,5(10)-estratriene-3, 6,7-triol-17-one or tetrol. Saponification of these compounds then produced the 3-tetrol namely, 1,3,5(10)-estratriene-3,6,7,17β-tetrol or the 3-triol namely, 1,3,5-(10)-estratriene-3,6,7-triol-17-one respectively. Upon reduction of the 17-keto group of the triol the same tetrol is produced. A modified form of process according to the present invention involves the treatment of the 6-dehydro estradiol or 6-dehydro estrone to form the corresponding 6,7-oxido compound. Hydration of this 6,7-oxido compound in an inert solvent in the presence of water and an acid catalyst gives the same estratriene tetrol or triol, as previously set forth, but isomeric at C-6 therewith.

The novel compounds of the present invention may therefore be illustrated by the following formulas:

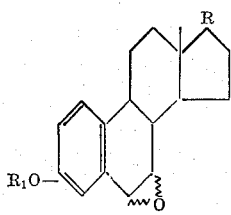

and

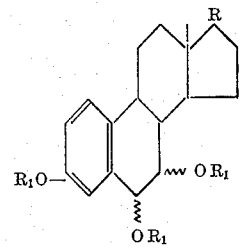

In the above equation R represents =O or —OR₁. R₁ represents hydrogen or an acyl group derived from a hydrocarbon carboxylic acid of less than 12 carbon atoms. As is well known in the art this acyl group may be saturated or unsaturated, of straight or branched chain, cyclic or mixed cyclic-aliphatic and may be conventionally substituted as with halogen or methoxy. Typical acyl groups are acetate, propionate, butyrate, hemisuccinate, caproate, benzoate, trimethylacetate, cyclopentylpropionate, phenoxypropionate, and β-chloropropionate.

The compounds set forth above may be prepared in accordance with a novel process which may be illustrated by the following equation:

In the above equation R and R₁ represent the same groups as heretofore set forth.

In practicing the process above illustrated 6-dehydroestradiol preferably in the form of its diesters in an organic solvent such as anhydrous ether and in the presence of a small amount of pyridine is treated with osmium tetroxide dissolved in ether. The reaction mixture is kept at room temperature in the dark for a relatively long period of time of the order of three days. The precipitate formed is then collected by filtration and treated with sodium sulfite in the presence of water and a lower aliphatic alcohol such as ethanol. The reaction mixture is then refluxed for a period of approximately one day and upon extraction, filtration and conventional purification there is obtained a product which includes the corresponding 17-monoester of 1,3,5(10)-estratriene-3,6,7,17β-tetrol as well as the free compounds. The 17-ester is obtained in the form of a crystalline precipitate and the mother liquors after filtration of the 17-ester yield a mixture of the free tetrol and the 17-monoester. The crude mixture obtained from the mother liquors could then be conventionally refluxed with a base in a lower alcohol to prepare the free compound. Conventional treatment of the free compound with acid anhydrides or chlorides of the type previously set forth at room temperature gave the 3-mono acylate. Heating in pyridine gave instead the tetra acetates. Similarly the treatment of 6-dehydro estrone 17-monoesters gave the corresponding 1,3,5(10)-estratriene-3,6,7-triol-17-one, and treatment at room temperature gave the 3-monoacylates whereas treatment under reflux conditions gave the corresponding triacylate.

In the equation as previously set forth there is also disclosed a modified method for preparing the novel compounds of the present invention which involves treatment of the 6-dehydro starting materials with an aromatic peracid to form the 6,7-oxido derivaties and treatment of these oxido derivatives in the presence of an organic solvent, water and an acid catalyst such as perchloric acid result in hydration of the oxido derivatives to give the tetrol or triol corresponding respectively to the 6-dehydro estradiol or 6-dehydro estrone. It may be noted that this particular reaction gave the trans-glycols whereas the first reaction gave the cis-derivatives. It may be noted, however, that treatment of the cis-glycols with acid under reflux conditions gave the inversion of the hydroxyl group at C–6. The oxido derivatives just mentioned could also be conventionally acylated at room temperature to give 3-mono esters and at elevated temperatures the diesters of the estradiol derivative.

The following specific examples serve to illustrate, but are not intended to limit the present invention.

*Example I*

A solution of 1.4 of the diacetate of 1,3,5(10),6-estratetraene-3,17β-diol in 200 cc. of anhydrous ether was treated with 3 drops of anhydrous pyridine and 1 g. of osmium tetroxide previously dissolved in 150 cc. of anhydrous ether. The reaction mixture was kept in the dark at room temperature for 3 days. The black precipitate formed was collected by filtration, well washed with ether, suspended in 300 cc. of ethanol and mixed with a solution of 7 g. of sodium sulfite in 500 cc. of water. The mixture was refluxed for 16 hours and the black precipitate was removed by filtration and washed with hot ethanol. The combined filtrate and washings were concentrated to a volume of 50 cc., poured into ice water and extracted with exthyl acetate. The extract was washed with water, dried over anhydrous sodium sulfate and concentrated to a small volume. Upon cooling there was obtained a crystalline precipitate of the 17-mono acetate of 1,3,5(10)-estratriene-3,6(cis),7(cis),17β-tetrol, which was purified by several recrystallizations from ethyl acetate. The pure compound showed M.P. 212–214° C., $[\alpha]_D +40.6°$, ultraviolet absorption maximum: λ max. 282 mμ (log E 3.32).

The mother liquors resulting after filtration of the 17-monoacetate of the crude 1,3,5(10)-estratriene-3,6(cis),7(cis),17β-tetrol contained a mixture of the free tetrol and its 17-monoacetate. The solvent was evaporated to dryness and the residue was refluxed with methanolic potassium hydroxide for 1 hour. It was then diluted with water and extracted with ethyl acetate and the extract was washed with water, dried over anhydrous sodium sulfate and evaporated to dryness, thus leaving a crystalline residue of the crude 1,3,5(10)-estratriene-3,6(cis),7(cis),17β-tetrol under the form of a solvate which had M.P. 150–155° C., then solidified after further heating and finally melted at 220–225° C. Several recrystallizations gave the analytical sample whose second melting point was 228–230° C., $[\alpha]_D +56°$ (dioxane), ultraviolet absorption: λ max. 282 mμ (log E 3.28).

*Example II*

A solution of 2 g. of the diacetate of 1,3,5(10),6-estratetraene-3,17β-diol in 200 cc. of ether was mixed with 90 cc. of a 0.39 normal solution of monoperphthalic acid in ether and the mixture was allowed to react at room temperature for 20 hours. It was then treated with water and the ether layer was separated, washed with sodium bicarbonate solution and water to neutral, dried over anhydrous sodium sulfate and evaporated to dryness. Crystallization of the residue from methanol yielded the diacetate of 6,7-oxido-1,3,5(10)-estratriene-3,17β-diol, M.P. 166–167° C., $[\alpha]_D -47°$ (chloroform), ultraviolet absorption: λ max. 268 mμ (log E 2.86).

This oxido compound was dissolved in 20 cc. of tetrahydrofurane and mixed with 4 cc. of 3-normal aqueous perchloric acid. The mixture was stirred at room temperature for 3 hours and then kept standing for 12 hours. After diluting with water, the product was extracted with ethyl acetate, washed with water, dried over anhydrous sodium sulfate and evaporated to dryness. Recrystallization of the residue from ethyl acetate gave the 3,17-diacetate of 1,3,5(10)-estratriene-3,6(trans),7(trans),17-tetrol. The free tetrol was obtained by refluxing with 1% methanolic potassium hydroxide.

*Example III*

When the acetate of 1,3,5(10),6-estratetraene-3-ol-17-one was treated with osmium tetroxide and then with sodium sulfite, in exactly the same way as described in Example I, there was obtained the crude 1,3,5(10)-estratriene-3,6(cis),7(cis)-triol-17-one as a residue from the extraction of the sulfite reaction product; this compound was obtained in the form of a crystalline solvate. The crude triolone had M.P. 130–150° C., and then solidified and melted again at 197–198° C. Several recrystallizations from ethyl acetate afforded the pure compound having a second melting point of 202–203° C., $[\alpha]_D +129°$ (chloroform), ultraviolet absorption: λ max. 282 mμ (log E 3.29).

240 mg. of the crude triolone was dissolved in 40 cc. of methanol, cooled to 5° C. and slowly treated under stirring with a solution of 300 mg. of sodium borohydride in 5 cc. of water. The mixture was stirred at room temperature for 1 hour further, acidified with acetic acid, diluted with water and extracted with ethyl acetate. The extract was washed with water, dried over anhydrous sodium sulfate and evaporated to dryness. The oily residue crystallized from ethyl acetate to give 1,3,5(10)-estratriene-3,6(cis),7(cis),17β-tetrol, identical to the tetrol obtained in accordance with the method of Example I.

*Example IV*

When the acetate of 1,3,5(10),6-estratetraen-3-ol-17-one was treated with monoperphthalic acid and then with aqueous perchloric acid, in exactly the same way as described in Example II, there were obtained the acetate of 6,7-oxido-1,3,5(10)-estratriene-3-ol-17-one and the 3-acetate of 1,3,5(10)-estratriene-3,6(trans), 7(trans)-triol-17-one, respectively. This triolone was treated with sodium borohydride, by an analogous method to that described in the previous example, thus producing 1,3,5(10)-estratriene-3,6(trans),7(trans),17β-tetrol, identical to the compound obtained in accordance with the method of Example II.

*Example V*

A mixture of 250 mg. of the crude 1,3,5(10)-estratriene-3,6(cis),7(cis),17β-tetrol, obtained by the method of Example I, 10 cc. of concentrated hydrochloric acid and 10 cc. of methanol was refluxed for one hour and then kept standing overnight. After dilution with water, the product was extracted with ethyl acetate, washed with water, dried over anhydrous sodium sulfate and evaporated to dryness. Recrystallization from ethyl acetate yielded 1,3,5(10) - estratriene-3,6(trans),7(trans),17β-tetrol, identical to the compound obtained by the method of the previous example.

*Example VI*

The treatment of the acetate of 1,3,5(10)-estratriene-3,6(trans),7(trans)-triol-17-one with 1% methanolic potassium hydroxide at room temperature for 2 hours afforded the free triolone. The same compound was also formed by refluxing 1,3,5(10)-estratriene-3,6(cis),7(cis)-triol-17-one (prepared by the method of Example III) with a mixture of hydrochloric acid and methanol.

Example VII 50 mg. of 1,3,5(10)-estratriene-3,6(cis),7(cis),17β-tetrol, obtained as described in Example I, was dissolved in 10 cc. of a 3% aqueous solution of sodium hydroxide, cooled to 10° C. and treated dropwise under continuous stirring with benzoyl chloride until the solution remained weakly acidic. It was then poured into water, extracted with ethyl acetate, dried over anhydrous sodium sulfate and evaporated to dryness. Crystallization of the residue from ethyl acetate afforded the 3-monobenzoate of 1,3,5(10)-estratriene-3,6(cis),7(cis),17β-tetrol.

Similarly, there was prepared other 3-monoesters of hydrocarbon carboxylic acids of less than 12 carbon atoms of 1,3,5(10)-estratriene-3,6(trans),7(trans),17β-tetrol, of 1,3,5(10) - estratriene - 3,6(cis),7(cis)-triol-17-one, of 1,3,5(10)-estratriene-3,6(trans),7(trans)-triol-17-one and of 6,7-oxido-1,3,5(10)-estratriene-3,17β-diol. In addition to the benzoate these were specifically the acetate, proprionate, caproate and cyclopentylpropionate.

Example VIII

A mixture of 900 mg. of 1,3,5(10)-estratriene-3,6(cis),7(cis),17β-tetrol, obtained as described in Example I, 20 cc. of pyridine and 40 cc. of acetic anhydride was heated on the steam bath for 1 hour and then poured into water. The product was extracted with ether, washed with dilute hydrochloric acid, water, sodium bicarbonate solution and water, dried over anhydrous sodium sulfate and evaporated. The residue crystallized from a mixture of ethyl acetate and ether to give the tetraacetate of 1,3,5(10)-estratriene-3,6(cis),7(cis),17β-tetrol, M.P. 225–227° C., [α]$_D$+17.4° (dioxane), ultraviolet absorption: λ max. 268, 274 mμ(log E 2.86 and 2.82).

By an analogous method there was obtained the triacetate of 1,3,5(10)-estratriene-3,6(cis),7(cis)-triol-17-one starting from the free triolone. It showed M.P. 188–189° C., [α]$_D$+106.6° (chloroform), ultraviolet absorption: λ max. 267 and 275 mμ (log E 2.86 and 2.81).

When reaction with acetic anhydride was applied to the free alcohols, there were also obtained the monoacetates of 6,7-oxido-1,3,5(10)-estratriene-3-ol-17-one, the diacetates of 6,7-oxido-1,3,5(10)-estratriene-3,17β-diol, and the triacetates of 1,3,5(10)-estratriene-3,6,7-triol-17-one. Other tetraesters of hydrocarbon carboxylic acids of less than 12 carbon atoms of 1,3,5(10)-estratriene-3,6,7,17β-tetrol were similarly prepared as well as the same monoesters 6,7-oxido-1,3,5(10)-estratriene-3-ol-17-one, the same diesters of 6,7-oxido-1,3,5(10)-estratriene-3,17β-diol and the same triesters of 1,3,5(10)-estratriene-3,6,7-triol-17-one. In addition to the acetates these were specifically the propionates, benzoates, caproates and cyclopentylpropionates.

We claim:
1. A novel compound of the following formula:

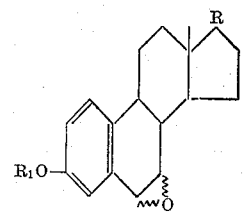

wherein R is selected from the group consisting of =O and —OR$_1$, and R$_1$ is selected from the group consisting of hydrogen and a hydrocarbon carboxylic acyl group of less than 12 carbon atoms.

2. 6,7-oxido-1,3,5(10)-estratriene-3-ol-17-one.
3. The acetate of 6,7-oxido-1,3,5(10)-estratriene-3-ol-17-one.
4. The propionate of 6,7-oxido-1,3,5(10)-estratriene-3-ol-17-one.
5. 6,7-oxido-1,3,5(10)-estratriene-3,17β-diol.
6. The 3,17-diacetate of 6,7-oxido-1,3,5(10)-estratriene-3,17β-diol.
7. The 3,17-diproprionate of 6,7-oxido-1,3,5(10)-estratriene-3,17β-diol.
8. The 3-benzoate of 6,7-oxido-1,3,5(10)-estratriene-3,17β-diol.
9. A novel compound of the following formula:

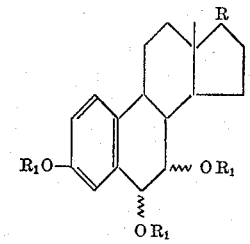

wherein R is selected from the group consisting of =O and —OR$_1$, and R$_1$ is selected from the group consisting of hydrogen and a hydrocarbon carboxylic acyl group of less than 12 carbon atoms.

10. 1,3,5(10)-estratriene-3,6,7-triol-17-one.
11. The 3-acetate of 1,3,5(10)-estratriene-3,6,7-triol-17-one.
12. The 3-benzoate of 1,3,5(10)-estratriene-3,6,7-triol-17-one.
13. The 3-propionate of 1,3,5(10)-estratriene-3,6,7-triol-17-one.
14. 1,3,5(10)-estratriene-3,6,7,17β-tetrol.
15. The 3-benzoate of 1,3,5(10)-estratriene-3,6,7,17β-tetrol.
16. The 17-acetate of 1,3,5(10)-estratriene-3,6,7,17β-tetrol.
17. The tetraacetate of 1,3,5(10)-estratriene-3,6,7,17β-tetrol.
18. The tetrapropionate of 1,3,5(10)-estratriene-3,6,7,17β-tetrol.

No references cited.